(12) United States Patent
Vlaovic et al.

(10) Patent No.: US 7,971,182 B1
(45) Date of Patent: Jun. 28, 2011

(54) APPLICATION ENVIRONMENT SPECIFICATIONS FOR PROVISIONING APPLICATION SPECIFIC RUNTIME ENVIRONMENTS USING UNDEFINED SYMBOLS

(75) Inventors: Stevan Vlaovic, Sunnyvale, CA (US); Richard Offer, Sunnyvale, CA (US); Lynn LeBlanc, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 1039 days.

(21) Appl. No.: 11/746,546

(22) Filed: May 9, 2007

Related U.S. Application Data

(60) Provisional application No. 60/798,897, filed on May 9, 2006, provisional application No. 60/830,866, filed on Jul. 14, 2006.

(51) Int. Cl.
*G06F 9/45* (2006.01)
*G06F 9/445* (2006.01)

(52) U.S. Cl. .................. 717/104; 717/121; 717/123

(58) Field of Classification Search .......... 717/104–108, 717/140–145, 121–123
See application file for complete search history.

(56) References Cited

U.S. PATENT DOCUMENTS

| | | | | |
|---|---|---|---|---|
| 5,159,687 | A * | 10/1992 | Richburg | 717/106 |
| 5,375,241 | A | 12/1994 | Walsh | |
| 5,701,487 | A * | 12/1997 | Arbouzov | 717/124 |
| 5,708,811 | A | 1/1998 | Arendt et al. | |
| 5,923,880 | A * | 7/1999 | Rose et al. | 717/145 |
| 5,946,486 | A | 8/1999 | Pekowski | |
| 6,238,290 | B1 | 5/2001 | Tarr et al. | |
| 6,487,713 | B1 * | 11/2002 | Cohen et al. | 717/105 |
| 6,523,172 | B1 * | 2/2003 | Martinez-Guerra et al. | 717/143 |
| 6,542,167 | B1 | 4/2003 | Darlet et al. | |
| 6,735,666 | B1 | 5/2004 | Koning | |
| 6,742,175 | B1 * | 5/2004 | Brassard | 717/107 |
| 6,779,187 | B1 | 8/2004 | Hammond | |
| 6,793,638 | B1 * | 9/2004 | DeToro et al. | 602/23 |
| 6,934,933 | B2 * | 8/2005 | Wilkinson et al. | 717/121 |
| 7,552,420 | B1 * | 6/2009 | Smith et al. | 717/121 |
| 7,584,461 | B2 * | 9/2009 | Plum | 717/143 |
| 7,681,186 | B2 * | 3/2010 | Chang et al. | 717/143 |
| 7,735,062 | B2 * | 6/2010 | de Seabra e Melo et al. | 717/120 |
| 7,788,238 | B2 * | 8/2010 | Gabriel et al. | 707/695 |
| 7,788,647 | B2 * | 8/2010 | Martin et al. | 717/135 |
| 7,810,080 | B2 * | 10/2010 | Plum et al. | 717/140 |
| 7,810,082 | B2 * | 10/2010 | Levenshteyn | 717/141 |
| 7,818,714 | B2 * | 10/2010 | Ryan et al. | 717/104 |
| 7,818,729 | B1 * | 10/2010 | Plum et al. | 717/140 |
| 7,895,591 | B2 * | 2/2011 | Spears | 717/168 |
| 2003/0060188 | A1 | 3/2003 | Gidron et al. | |
| 2005/0138193 | A1 | 6/2005 | Encarnacion et al. | |
| 2006/0288054 | A1 | 12/2006 | Johnson et al. | |

(Continued)

OTHER PUBLICATIONS

SCBXP: El-Hassan et al, "An efficient CAM based XML parsing technique in hardware environments", IEEE, pp. 1-9, 2011.*

(Continued)

*Primary Examiner* — Anil Khatri

(57) ABSTRACT

Systems and methods of executing an application in an application specific runtime environment are disclosed. The application specific runtime environment is defined by an application environment specification to include a minimal or reduced set of software resources required for execution of the application. The application environment is generated by determining software resource dependencies and is used to provision the application specific runtime environment in real-time in response to a request to execute the application. Use of the application specific runtime environment allows the application to be executed using fewer computing resources, e.g., memory.

30 Claims, 11 Drawing Sheets

U.S. PATENT DOCUMENTS

2008/0046708 A1     2/2008     Fitzgerald et al.
2009/0083314 A1     3/2009     Maim

OTHER PUBLICATIONS

Foulkes et al, "Software configuration management and its contribution to reliability program management", IEEE, pp. 289-292, 1983.*
Hoek et al, "A tested for configuration management policy programming", IEEE, vol. 28, No. 1, pp. 79-99, 2002.*
Nllsson et al, "Parsing formal languages using natural language parsing techniques", ACM IWPT, pp. 49-60, 2009.*
Mei et al, "A software configuration management model for supporting component based software development", ACM SIGSOFT, vo. 26, No. 2, pp. 53-58, 2001.*
Render et al, "An object oriented model of software configuration management", ACM pp. 127-139, 1991.*
U.S. Appl. No. 11/746,578, filed May 9, 2007, Vlaovic et al.
U.S. Appl. No. 11/895,518, filed Aug. 24, 2007, Vlaovic et al.
U.S. Appl. No. 11/900,402, filed Sep. 10, 2007, Stevan Vlaovic.
U.S. Appl. No. 12/027,847, filed Feb. 7, 2008, Richard Offer.
U.S. Appl. No. 12/190,995, filed Aug. 13, 2008, Richard Offer.
U.S. Appl. No. 12/239,558, filed Sep. 26, 2008, Richard Offer.
U.S. Appl. No. 12/354,399, filed Jan. 15, 2009, Richard Offer.
U.S. Appl. No. 12/495,638, filed Jun. 30, 2009, Richard Offer et al.
U.S. Appl. No. 12/639,957, filed Dec. 16, 2009, Richard Offer et al.

* cited by examiner

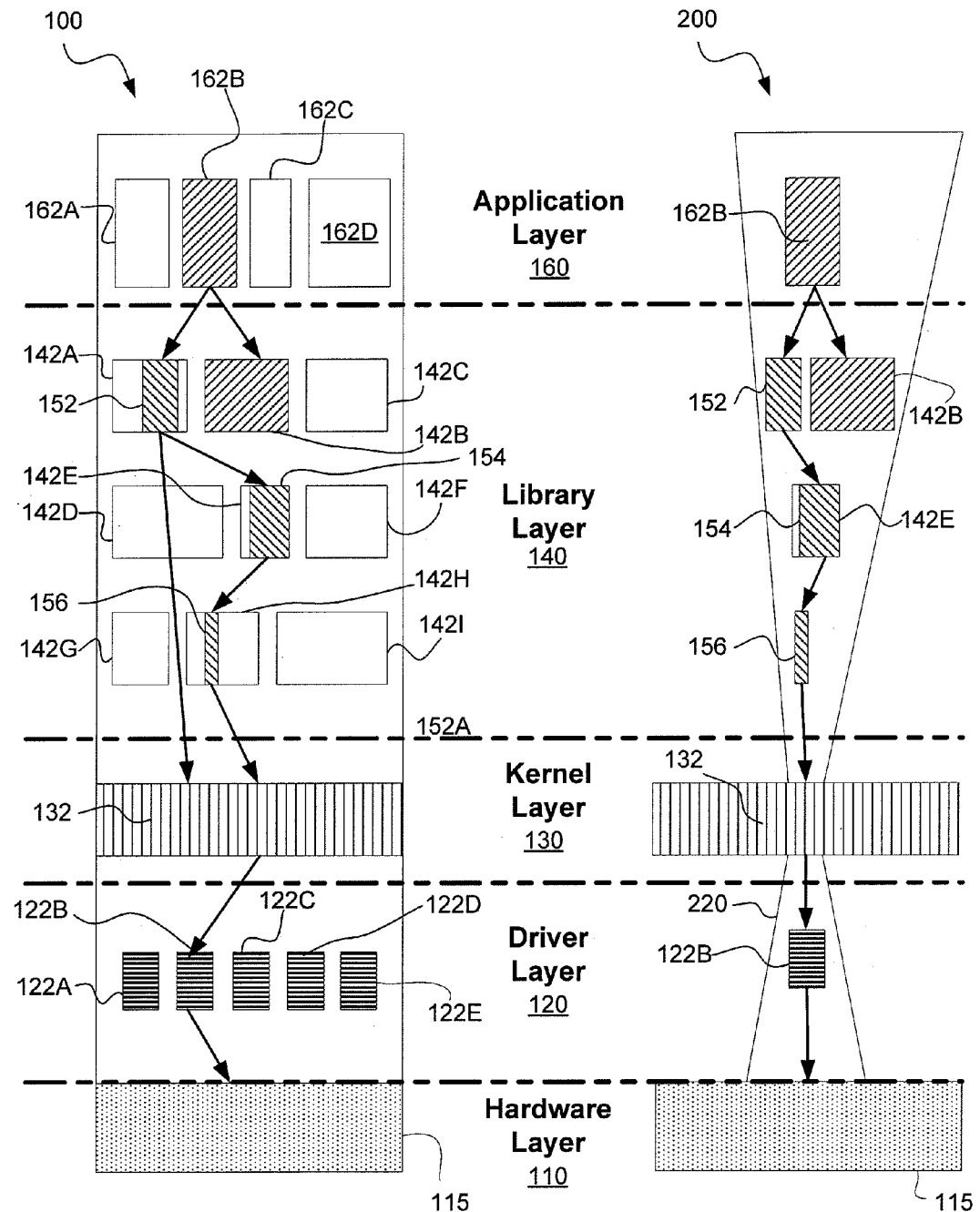

APPLICATION ENVIRONMENT SPECIFICATIONS FOR PROVISIONING APPLICATION SPECIFIC RUNTIME ENVIRONMENTS USING UNDEFINED SYMBOLS

CROSS-REFERENCE TO RELATED APPLICATIONS

This application claims benefit of and priority from U.S. Provisional Patent Application No. 60/798,897, filed May 9, 2006 and entitled "Systems and Methods for Precise Environments for Software Applications;" and U.S. Provisional Patent Application No. 60/830,866, filed Jul. 14, 2006 and entitled "Systems and Methods for Determining a Software Application's Precise Software Resource Requirements." The disclosures of the above patent applications are hereby incorporated herein by reference.

BACKGROUND

1. Field of Invention

The present application relates to software applications and their environments and more specifically to reduced environments for applications.

2. Related Art

Currently, applications require specific environments in which to execute. For example, applications are usually constructed with a specific operating system environment in mind, and migrating to a different operating system environment requires a different version of the application. In addition to operating system environments, there are also specific hardware requirements associated with applications. At the base level, an application compiled for use on a specific instruction set architecture (ISA) will be unable to execute on a machine with a different ISA.

Commonly used routines are frequently encapsulated in libraries configured to be accessed by applications. These libraries are generally shared among many different applications, allowing the software developer to leverage common functionality and reduce the application's file size. This approach is advantageous when a number of different applications make use of the same commonly used routines. The libraries that an application uses, but are not included with the distribution of the application, need to be present in the application's executing environment to execute the application as intended.

It is common practice to provide a wide variety of libraries and/or individual helper routines in an operating environment in order to support a wide variety of applications. Together these supporting elements comprise a general runtime environment that provides software services for processes or programs while a computer is running. The general runtime environment may further include an operating system, an associated kernel, and software that runs beneath the operating system, such as hardware and/or device drivers.

A general runtime environment may include many components that are not required by those applications that are actually executed. This may be a disadvantage in circumstances that include limits on available memory or other resources consumed by the unused components, or when the extra components conflict with each other.

SUMMARY

Various embodiments of the invention include systems and methods of generating an application specific runtime environment for execution of an application, and executing the application within this environment. An application specific runtime environment includes software functionality required for executing a specific application. For example, the application specific runtime environment may include an executable application, an operating system, libraries, hardware drivers, configuration files, data, and any other software functionality required to execute the application.

The application specific runtime environment is typically a subset of a general runtime environment. As such, the application specific runtime environment is a reduced environment that requires fewer resources than a general runtime environment. For example, an application specific runtime environment may require less memory during application execution and/or less storage.

In various embodiments, an application specific runtime environment for a particular application is defined by an application environment specification. As is further described herein, some embodiments of the invention include systems and methods of determining an application environment specification. An application environment specification is optionally used to create an application specific runtime environment on-demand in response to a request to execute the related application. An application environment specification is optionally specific to a certain set of hardware.

In some embodiments, an application environment specification is used to generate an application specific runtime environment within a virtual machine. This virtual machine may be configured specifically in response to the application environment specification. For example, the virtual machine may be allocated resources, such as memory and software, as specified by the application specific runtime environment. This allocation may occur in response to a request to run the associated application. In some embodiments, a single hardware device may be configured to support more than one virtual machine.

Various embodiments of the invention include a system comprising a resource repository configured to store resources, the resources comprising a software library configured to be used by two or more executable applications, a parser configured to identify a first undefined symbol in an executable application, to identify a first member of the resources including a definition of the first undefined symbol, and to add an identify of the first member to an application environment specification, and an application environment specification storage configured to store the application environment specification.

Various embodiments of the invention include a method comprising identifying a first unresolved symbol in an executable application, identifying a first resource comprising a definition of the first unresolved symbol, adding a first identifier of the first resource to an application environment specification, the application environment specification comprising a specification of an application specific runtime environment configured for executing the executable application, determining if the first resource includes a second unresolved symbol, if the first resource includes a second unresolved symbol, identifying a second resource comprising a definition of the second unresolved symbol and adding a second identifier of the second resource to the application environment specification, and associating the executable application with the application environment specification.

Various embodiments of the invention include a computer readable media having stored thereupon an application environment specification configured for provisioning of an application specific runtime environment and comprising one or more identifiers of resources required for execution of an executable application, a first of the resources including a definition of an undefined symbol within the executable application and a second of the resources including a definition of an undefined symbol within the first of the resources.

Various embodiments of the invention include a system comprising an external interface configured for a user to request execution of an executable application, a repository configured to store the executable application, resources and an application environment specification, the application environment specification including identification of those members of the resources on which execution of the executable application is dependent, a processing node configured for execution of the executable application in an application specific runtime environment, and a provisioning server configured to use the application environment specification to locate members of the resources and to uses these members to provision the application specific runtime environment.

Various embodiments of the invention include a method comprising receiving a request for execution of a first executable application, identifying an application environment specification associated with the first executable application, the application environment specification including the identity of resources on which the first executable application is dependent, locating the resources on which the first executable application is dependent, in a repository including resources on which a plurality of executable applications are dependent, provisioning an application specific runtime environment on a processing node, the application specific runtime environment including the resources on which the first executable application is dependent, and executing the first executable application on the processing node in response to the request.

Various embodiments of the invention include a computer readable media having stored thereupon an application specific runtime environment comprising a first executable application, a plurality of resources on which the first executable application depends, the plurality of resources identified using an application environment specification generated by parsing the executable application and at least one of the plurality of resources prior to executing the first executable application.

BRIEF DESCRIPTION OF THE DRAWINGS

FIG. 1 is a block diagram illustrating a general runtime environment of the prior art.

FIG. 2 is a block diagram illustrating an application specific runtime environment 200, according to various embodiments of the invention.

DETAILED DESCRIPTION OF THE INVENTION

Figure 3:
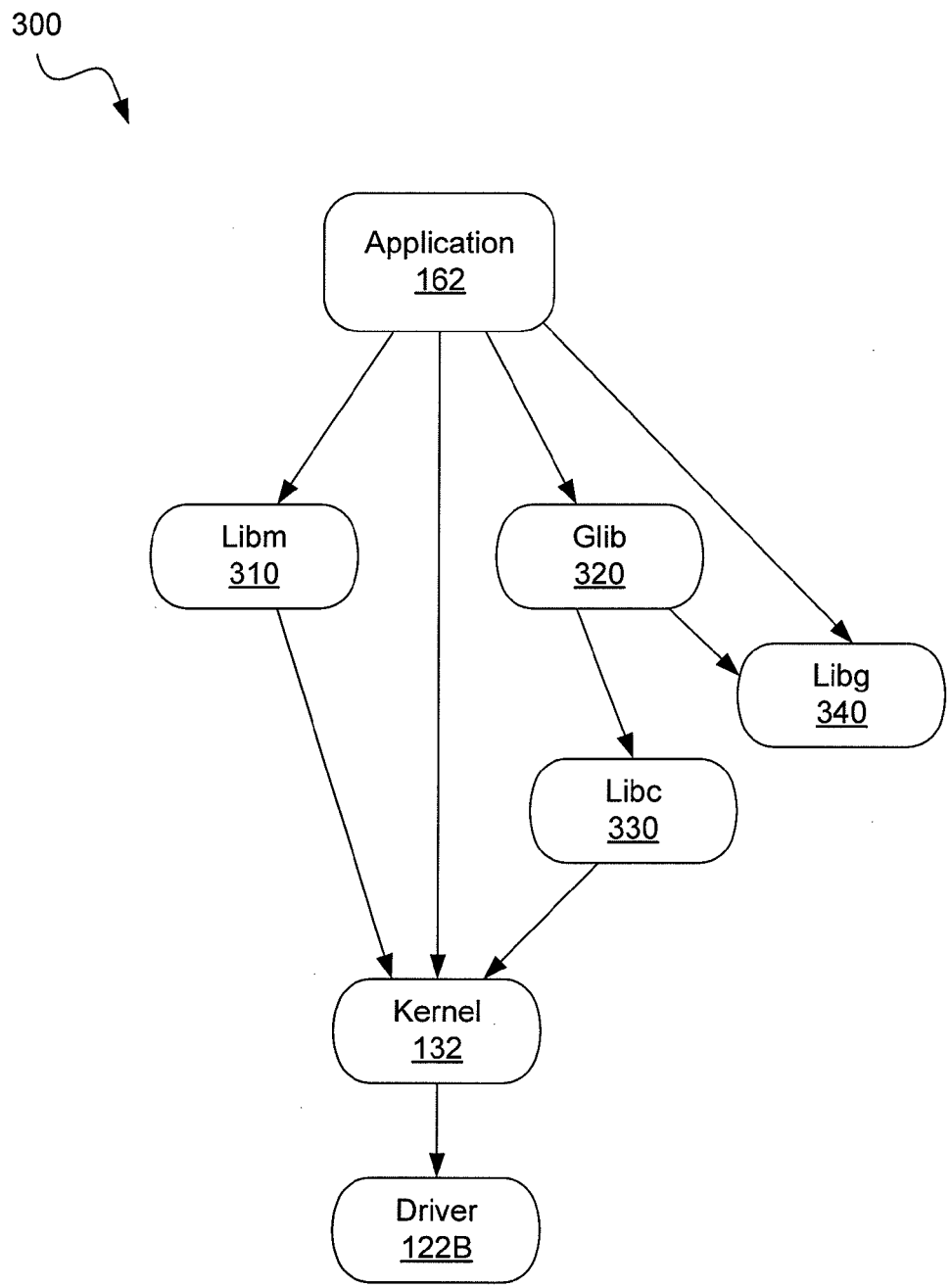
FIG. 3 includes a file dependency tree illustrating exemplary file dependencies, according to various embodiments of the invention.

Various embodiments of the invention include an application environment specification associated with a specific executable application and optionally associated with a specific hardware environment. The application environment specification is developed by examining the executable application and identifying the resources required for execution of that executable application. These resources may include for example, symbol definitions, operating system elements, drivers, and/or memory. Identified resources are optionally examined, themselves, to identify further required resources. Typically, the resources specified in an application environment specification are a subset of those resources that would be found in a general runtime environment. The executable application can, therefore, be executed using a reduced environment relative to the prior art.

Optionally, the application environment specification is developed and stored for later use. For example, the application environment specification can be developed prior to receiving a request for execution of the associated application. Alternatively, the application environment specification may be developed in response to receiving a first request for execution of the associated application, and then stored for use in response to further requests.

When a request to run an executable application is received, the associated application environment specification is used to dynamically create (e.g., provision) the required application specific runtime environment. This application specific runtime environment is typically created in real-time. Provisioning of the application specific runtime environment optionally includes transferring resources from a storage location to a separate device where the application will be executed. The separate device may be a separate computing device, a separate server, a virtual machine, and/or the like. The executable application can then be executed in the application specific runtime environment.

FIG. 1 is a block diagram illustrating a General Runtime Environment 100 of the prior art. The General Runtime Environment 100 includes an Application Layer 160 including a variety of separate Executable Applications 162A-162D, which may be executed within the General Runtime Environment 100. The General Runtime Environment 100 also includes a Library Layer 140, a Kernel Layer 130, a Driver Layer 120, and a Hardware Layer 110. These layers include, respectively, various Libraries 142A-142I, a Kernel 132, Drivers 122A-122E, and Hardware 115 configured for executing computing instructions included in the other layers.

Hardware 115 includes, for example, integrated circuits, network devices, input and output devices, storage devices, display devices, memory, processor(s), and/or the like.

The Driver Layer 120 includes Drivers 122A-122E configured to provide the lowest level of software control over Hardware 115 as required by Executable Applications 162A-162D. For example, the Drivers 122A-122E may include drivers for audio devices, disk drives, video cards, processors, network interface cards, mice, universal serial bus controllers or any potential hardware that may be used by any of the applications in the Application Layer 160. Device Drivers 122A-122E may include drivers configured for controlling additional hardware other than the Hardware 115 included in Hardware Layer 110. Further, device Drivers 122A-122E may be configured to perform additional actions other than those that may be required by applications 162-162D. For example, some of device Drivers 112 may be received as part of an operating system and be included so that the operating system supports a wide variety of Hardware 115. Likewise, device Drivers 112 may be configured to perform tasks as may be required by a wide variety of applications.

The Kernel Layer 130 comprises the Kernel 132, which is the central logic of an operating system. For example, the Kernel 132 may be involved in management of memory and execution threads. The Kernel 132 coordinates access to Hardware 115 through device Drivers 122A-122E in order to accomplish tasks of required by the Executable Applications 162A-162D. The Kernel 132 may be accessed directly by the Executable Applications 162A-162D or by Libraries 142A-142I including in the Library Layer 140.

The Library Layer 140 includes Libraries 142A-142I, which may be provided as part of an operating system or provided separately to support specific members of Executable Applications 162A-162D. Each of Libraries 142A-142I can include sub-components, such as sub-libraries or individual modules. For example, Components 152, 154 and 156 may be included within Libraries 142A, 142E and 142H respectively. Libraries 142A-142I are configured to access Kernel 132 and support operations of Executable Applications 162A-162D. This access and support can be either direct or indirect. For example, library 142A may access Kernel 132 directly or via Libraries 142E and 142H.

These Executable Applications 162A-162D are differentiated from source code and object files in that they are executable directly from a command line. Executable Applications 162A-162D are ready to be executed without further compiling and typically include file names ending in .exe, .com, .bat, .js, .php., .scrpt., .as, or the like. For example, the executable application may include a database, accounting, presentation, CAD, imaging, multimedia, scientific, mathematical, web-based, communication, vertical market-based, or other software application.

During normal execution, Executable Application 162B makes calls to the Components 152 within library 142A. Components 152, in turn, makes calls to Components 154, and Components 154 makes calls to Components 156. Further, Components 156 makes calls to Kernel 132, Kernel 132 makes calls to Drivers 122A-122E, and Drivers 122A-122E control Hardware 115 to complete the task requested by Executable Application 162B. Executable Application 162B may also make calls directly to Kernel 132, Drivers 122A-122E, Components 142H, and/or the like. Executable Application 162B may also make calls to Library 142C, which returns resulting information to Executable Application 162B.

FIG. 2 is a block diagram illustrating an Application Specific Runtime Environment 200 configured for execution of Executable Application 162B, according to various embodiments of the invention. As illustrated, much of the resources included in the General Runtime Environment 100 are not included in the Application Specific Runtime Environment 200. Specifically, to the extent practical, in some embodiments only those resources required for the execution of Executable Application 162B are included in Application Specific Runtime Environment 200.

Typically, the Application Specific Runtime Environment 200 is generated on-demand according to an application environment specification associated with Executable Application 162B, and optionally associated with Hardware 115. For example, as illustrated in FIG. 1, Executable Application 162B does not require library 142C. Library 142C is, therefore, not specified by the application environment specification for inclusion in Application Specific Runtime Environment 200. Likewise, because library 142B is required by Executable Application 162B, library 142B is specified as being included in Application Specific Runtime Environment 200 by the associated application environment specification.

In some cases, a specific library component can be separated from the remainder of a library for inclusion in Application Specific Runtime Environment 200. For example, FIG. 2 shows Components 152 separated from the remainder of Library 142A. In some cases, a specific library component cannot be separated from the remainder of a library. For example, Components 154 cannot be separated from Library 142E. As such, all of library 142E is included in Application Specific Runtime Environment 200.

The Application Level 160 illustrated in FIG. 2 contains fewer applications than the Application Level 160 illustrated in FIG. 1. The Application Layer 160 of Application Specific Runtime Environment 200 contains the Executable Application 162B, and may contain one or more helper applications that a user may want to use in combination with Executable Application 162B. A helper application is external to a host application for which functionality is added to the host application. For example, Windows Media Player™ is a helper application for playing streaming content in a browser application.

The Library Layer 140 of Application Specific Runtime Environment 200 typically comprises fewer components than the Library Layer 140 of General Runtime Environment 100. In Application Specific Runtime Environment 200, the library environment contains components required by Executable Application 162B during execution, such as the Components 152, 154, and 156. Some components may be extracted from their respected libraries while other components can only be added to Application Specific Runtime Environment 200 as part of a full library. For example, as illustrated in FIG. 2, Components 152 has been extracted from library 142A while Components 154 is added along with other, unused parts, of library 142E.

The same Kernel 132 is optionally included in each of the Application Specific Runtime Environment 200 and the General Runtime Environment 100. The same Kernel 132 is used because kernels are typically difficult to divide into separate parts. In addition, the use of the same Kernel 132 results in the same deterministic behavior in each of General Runtime Environment 100 and the Application Specific Runtime Environment 200.

The Driver Layer 120 of Application Specific Runtime Environment 200 contains device drivers, such as Driver 122B, used by Executable Application 162B during execution. The Driver Layer 120 included in Application Specific Runtime Environment 200 typically has fewer drivers than the Driver Layer 120 of application runtime environment 100. The Hardware 115 may be the same for both the runtime environment 100 and the Application Specific Runtime Environment 200.

The components and libraries included in Application Specific Runtime Environment 200 are a function of dependencies between these various elements. These dependencies arise when Executable Application 162B makes use of a symbol or other data that is defined in one of the other components. For example, Executable Application 162B may be dependent on Component 152 and library 142B for proper execution.

Symbols may include identifiers of functions, procedures, variables, types, or the like, that are used by an application. For example, a symbol called "print" may be a handle to a function used for printing. A symbol may be used in an executable application, a library, a kernel or a driver, and may be defined in the same file that it is used or in another file. If the definition of a symbol is in a file other than the file in which it is used, then the definition must be available in the other file at the time of execution. As such, any references to "print" must be resolvable using the definition of "print." This definition typically includes computing instructions to be performed by the function. At runtime, if the definition of "print" is not within the file in which the symbol is used, then the definition is looked for by the operating system or compiler. For example, a dynamic runtime linker may be used to find the definition of "print" when it is required by the application.

FIG. 3 includes File Dependency Tree 300 illustrating exemplary file dependencies for Executable Application 162B, according to various embodiments of the invention. For illustrative purposes, these dependencies are different from those illustrated in FIG. 2. The block diagram 300 comprises library Libm 310, library Glib 320, library Libc 330 and library Libg 340, which are embodiments of Libraries 142A-142I. The Executable Application 162B is dependent directly on the library Libm 310, the library Glib 320, and the library Libg 340. These libraries are, in turn, dependent on Libc 330, Kernel 132 and Driver 122A-122E.

Given the dependencies illustrated in FIG. 3, an application environment specification for the Executable Application 162B will include data identifying library Libm 310, library Glib 320, library Libc 330, library Libg 340, and Kernel 132. If the application environment specification is specific to a particular hardware environment, then the application environment specification may also include data identifying Driver 122B. As is described further herein, the application environment specification optionally also includes meta information such as the number of bytes required to store the required resources and the amount of working memory required to execute Executable Application 162B. This meta information may include a large variety of information such as an authorized user identifier, licensing information, executable applications that can be jointly provisioned, and/or the like. The resulting embodiment of Application Specific Runtime Environment 200 or 300 includes the Executable Application 162B, library Libm 310, library Glib 320, library Libc 330, library Libg 340, Kernel 132 and Driver 122B.

Figure 4:
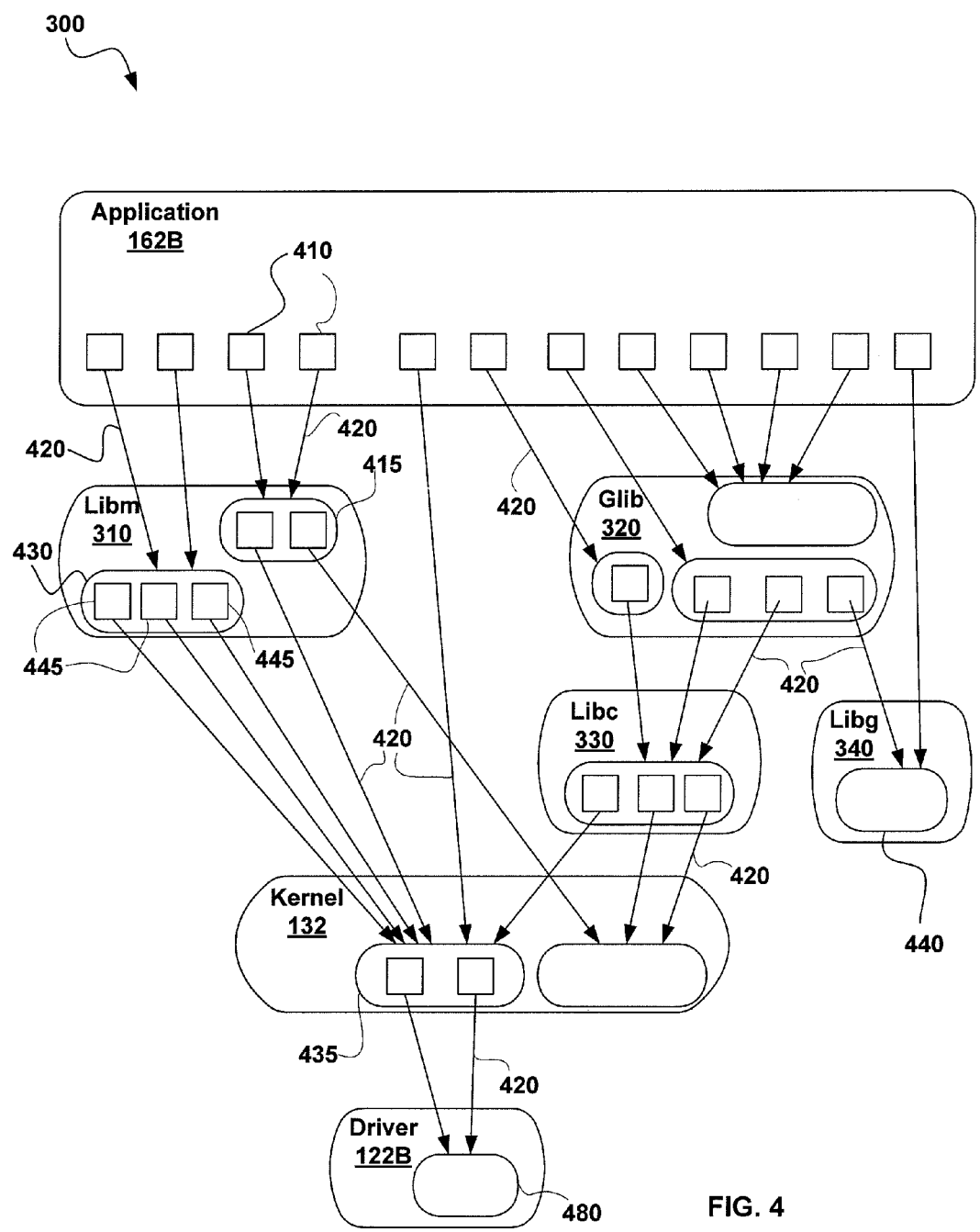
FIG. 4 illustrates further details of the file dependency tree of FIG. 3, according to various embodiments of the invention.

FIG. 4 illustrates further details of the File Dependency Tree 300 illustrated in FIG. 3, according to various embodiments of the invention. As illustrated in FIG. 4, the dependency tree 300 may comprise symbols or other dependencies, indicated by squares, which are defined outside of the particular files in which they are used. For example, Symbol 410 is defined by, at least in part, by a Definition 415 within Libm 310. Symbol 410 may be used more than one time within Executable Application 162B. For example, Symbol 410 may be a handle to a function used twice in executable application, and definition 415 may include the logic, e.g. computing instructions, of the function. In FIG. 4, Arrows 420, some of which are labeled, are used to illustrate dependencies.

A symbol definition may include further symbols that are defined in other definitions. For example, a Definition 430 within Libm 310 includes three Symbols 445 defined in a Definition 435 of Kernel 132. Likewise, Definition 435 includes symbols 450 defined by a Definition 480 within Driver 122B.

An application runtime specification is developed by identifying these dependencies and a minimal set of components required to execute an application. As is discussed further herein, the identification of dependencies is accomplished using a top down approach starting with Executable Application 162B. The application runtime specification is optionally developed without executing the executable application.

Figure 5:
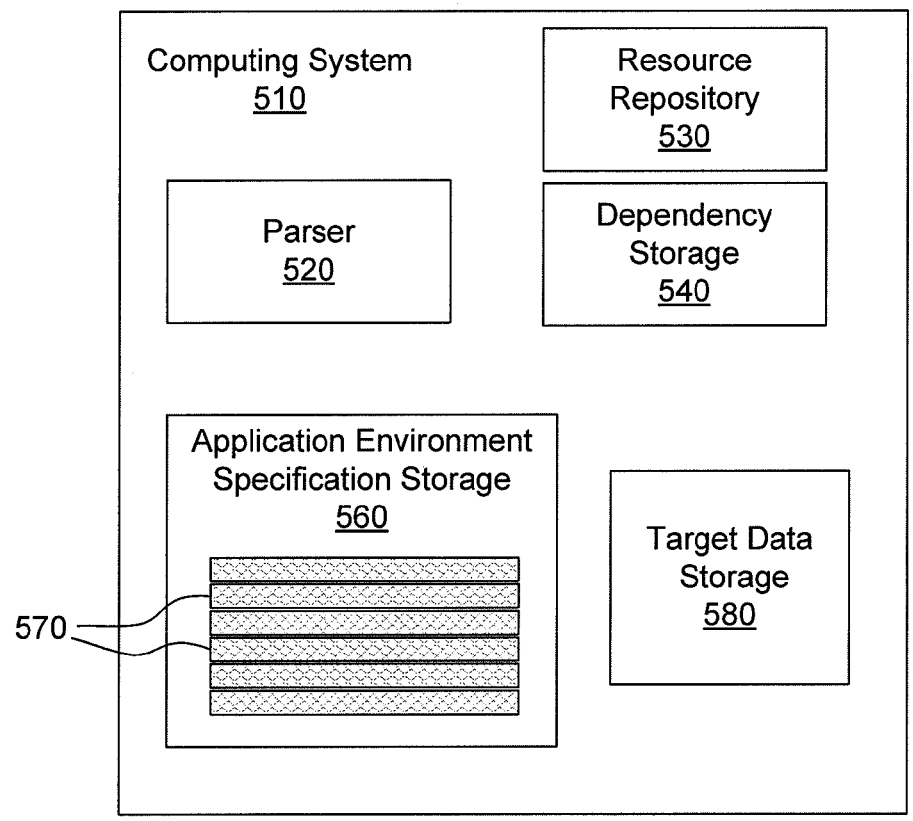
FIG. 5 is a block diagram of a computing system configured for generation of an application runtime specification, according to various embodiments of the invention.

FIG. 5 is a block diagram of a Computing System 510 configured for generation of an application runtime specification, according to various embodiments of the invention. Computing System 510 is configured to receive one or more of executable application, e.g., Executable Application 162B, and a set of resources such as Libraries 142A-142I, Kernel 130, and Drivers 122B. As is discussed further herein, Computing System 510 uses these inputs to identify the set of resources required by the executable application and to include identification of the set as part of an application environment specification. The set of resources required by the executable application is typically a subset of the total resources available. Computing System 510 comprises a Parser 520, a Resource Repository 530, a Dependency Storage 540, an optional Target Data Storage 580, and an Application Environment Specification Storage 560.

Parser 520 is configured to parse the executable application. This parsing includes, for example, identifying grammatical structures, variables, data, symbols, and symbol definitions within the executable application. Parser 520 is configured to receive the executable application as compiled computing instructions and/or as a script. In some embodiments, Parser 520 is configured to generate a tree data structure that reflects the grammatical structure of the executable application. For example, Parser 520 may operate in two stages, a first stage including identifying meaningful elements in the input, and a second stage including building a parse tree from those elements.

Parser 520 is configured to identify those symbols within the executable application that are defined by a definition within the executable application and those symbols that are not defined by a definition within the executable application. For those symbols that are not defined by a definition within the executable application, Parser 520 is configured to search other resources for a definition. These resources may include Libraries 142A-142I, Kernel 132 and/or Drivers 122A-122E.

The Libraries 142A-142I, Kernel 132 and/or Drivers 122A-122E may be stored along with other resources in a Resource Repository 530. Resource Repository 530 includes storage such as a hard drive or an optical drive. In some embodiments, Resource Repository 530 is distributed among several storage devices.

In some embodiments, Resource Repository 530 includes an image, or part thereof, of an application specific runtime environment. For example, if a set of resources are commonly used in combination, then these resources may be stored as a unit. In some embodiments, Resource Repository 530 includes an image of an entire application specific runtime environment. In these embodiments, the application environment specification may merely include a reference to this image. Provisioning of the application specific runtime environment may then include copying the image or components of the image of the application specific runtime environment to a location for execution of the executable application.

As is further described elsewhere herein, when a resource such as Library 142B is identified as including a definition of a symbol within the executable application, and a definition is not found in the executable application, then the executable application is considered dependent on the resource. Optionally, data representative of this dependence is stored in a Dependency Storage 540. The data may include an identifier of the resource or of an extractable component of the resource. After the executable application has been processed by Parser 520, Dependency Storage 540 may include identification of several resources on which the executable application is dependent.

Some of the resources included in Resource Repository 530 and identified in Dependency Storage may themselves include undefined symbols. These symbols are identified by processing the resource using Parser 520 in a manner similar to the processing that is applied to the executable application. The identification of dependencies may be performed as an iterative process. As such, a hierarchy of dependencies can be identified.

A list of resources required for the execution of the executable application is stored as an application environment specification in an Application Environment Specification Storage 560. Application Environment Specification Storage 560 includes one or more hard drive, optical drive, or the like. The application environment specification may include records 570 comprising data identifying each of the resources indicated as being required for the execution of the executable application. This data may be retrieved from Dependency Storage 540 after the processing of the executable application and required resources using Parser 520, and can also include additional configuration files, etc. In alternative embodiments, Dependency Storage 540 and Application Environment Specification Storage 560 are combined into a single storage.

In some embodiments, the application environment specification stored in Application Environment Specification Storage 560 is specific to a predetermined hardware target. Information about this hardware target is optionally stored in a Target Data Storage 580. For example, if the target includes a specific display device and a specific processor type, this information is stored in Target Data Storage 580 and used by Computing System 510 for the selection of appropriate members of Drivers 122A-122E.

In some embodiments, Parser 520 is configured to generate a multiple application environment specification. A multiple application environment specification is an application environment specification configured for provisioning the resources required by two or more executable applications in combination. For example, if a user wishes to execute a database and accounting application at the same time, it may be desirable to provision both of these executable applications in the same application specific runtime environment.

A multiple application environment specification can be generated by merging two previously existing application specific environment specifications, e.g., combining their lists of required resources and removing duplicates. Alternatively, a multiple application environment specification can be generated by processing both executable applications using Parser 520 to generate a multiple application environment directly.

Figure 6:
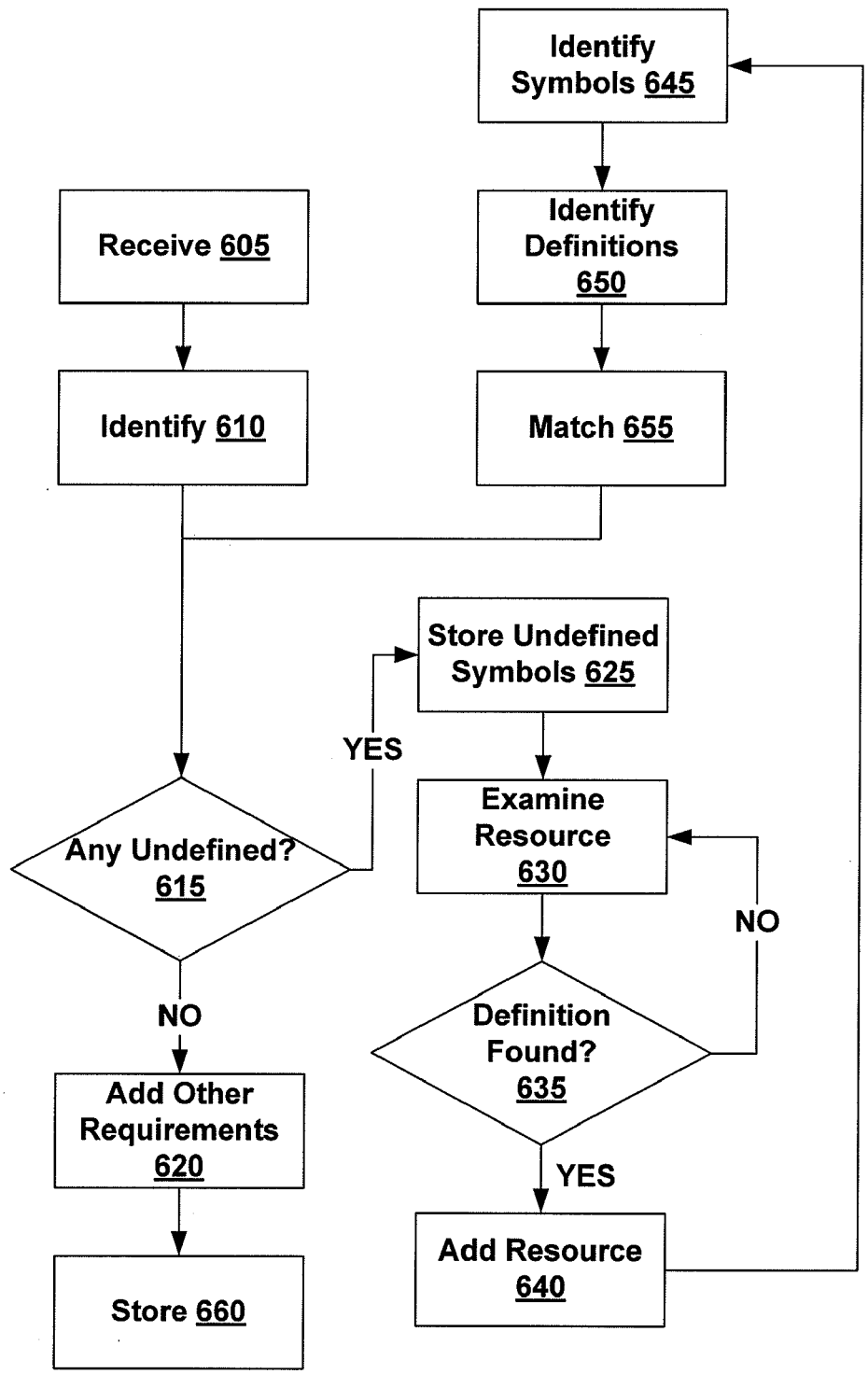
FIG. 6 is a flowchart illustrating a method of generating an application environment specification, according to various embodiments of the invention.

FIG. 6 is a flowchart illustrating a method of generating an application environment specification, according to various embodiments of the invention. This method may be applied to executable applications that include compiled computer code or a script. The method includes iterative steps in which a hierarchy of dependent files are processed.

In a Receive Step 605, Computing System 510 receives an executable application, e.g., Executable Application 162B, for which an application environment specification is to be generated. The received executable application can include compiled computer code, a script, and/or any other executable file. Receive Step 605 may also include receiving target data that characterized a specific target hardware environment to be associated with the application environment specification.

In an Identify Step 610, symbols and symbol definitions are identified within the received executable application using Parser 520. The identification is optionally performed without executing the executable application. If the executable application includes a symbol import table that lists symbols whose definitions need to be imported, then this table may be used to identify some or all of the symbols required by the executable application. The symbol import table may be generated by a compiler. The executable application is optionally fully parsed in order to identify undefined symbols. As discussed elsewhere herein, this parsing can include identification of symbols, definitions, data and other parts of the executable application. Unidentified symbols are stored in Dependency Storage 540.

If the executable application includes a script, then Identify Step 610 may include converting the script into a series of tokens and interpreting these tokens. Processing of a script is described in further detail elsewhere herein.

In an Any Undefined Step 615 it is determined if any undefined symbols were identified in Identify Symbols Step 610. If no undefined symbols were found, then the method proceeds to an optional Add Other Requirements Step 620. If undefined symbols were found, then the method proceeds to an optional Store Undefined Symbols Step 625.

In Store Undefined Symbols Step 625, any undefined symbols are stored in Dependency Storage 540. These symbols are optionally stored in a tree data structure.

In an Examine Resource Step 630 one or more of the resources within Resource Repository 530 is examined in order to find definitions for the undefined symbols stored in Dependency Storage 540. This examination may be performed one resource at a time or several resources at a time. The examined resources may include Libraries 142A-142I, Kernel 132, and/or Drivers 122A-122E. Sometimes, these resources will include export tables having a list of symbols defined in the resource and pointers to those definitions. When this is the case, examination of the resource typically includes examination of these tables.

In a Definition Found Step 635, it is determined whether a definition for an undefined resource was found. If not, then Examine Resource Step 630 is optionally repeated until a definition is found. If no definition is found for an undefined symbol after examining all or Resource Repository 530, then Computing System 510 may be configured to seek additional resources.

If a definition is found in Examiner Resource Step 630 then an identifier of the resource is added to Dependency Storage 540 in an Add Resource Step 640. For example, the identifier may include a file name, version, distribution, license information, user information, directory, and/or the like. In some embodiments, a definition of a symbol can be extractable from a resource. If this is possible, then the identifier stored in Add Resource Step 640 may include both an identification of the resource and an identification of the extractable component within the resource.

In an Identify Symbols Step 645, the resource whose identifier is added to Dependency Storage 540 in Add Resource Step 640 is processed to identify any undefined symbols within the resource. Identify Symbols Step 645 is similar to Identify Symbols Step 610 except that the data parsed is a resource rather than the executable application.

In an Identify Definitions Step 650, the resource whose identifier was added to Dependency Storage 540 in Add Resource 640 is examined to identify any additional definitions within the resource. For example, the resource may include several definitions, one of which was identified as being for an undefined symbol in Examiner Resource Step 630.

In a Match Step 655, the other definitions found in Examine Resource Step 630 and identified in Identify Definitions Step 650 are compared with the undefined symbols stored in Dependency Storage 540. These definitions may be for one or more of the undefined symbols. If a match is found between any of the undefined symbols and the definitions then the state of the symbol is changed from undefined to defined, and an identification of the resource and/or component thereof is added to the Dependency Storage in association with the match symbol. Any Undefined Step 615 is then repeated as part of a next iteration. In this iteration the undefined symbols stored in Store Undefined Symbols may include symbols used by a resource found in a previous iteration.

If no other symbols are undefined, then the method proceeds to an optional Add Other Requirements Step 620. In Add Other Requirements Step 620, additional information may be added to Dependency Storage 540. This additional information may include memory requirements, known data, and/or configuration information.

In a Store Step 660, the dependency information developed using the method of FIG. 6 and stored in Dependency Storage 540 is stored as an application environment specification in Application Environment Specification Storage 560. Store Step 660 may further include storage of target information from Target Data Storage 580 in Application Environment Specification Storage 560. The stored application environment may be kept for later use and/or used immediately. Store Step 660 optionally includes combining more than one application environment specification to generate a multi-application environment specification.

Each stored application environment specification is associated with an executable application, such as Executable Application 162B, and optionally a specific hardware target. In some embodiments, the executable application is associated with the application environment specification by using a name and version of the executable application as an index within the Application Environment Specification Storage 560. In some embodiments, the executable application and application environment specification are associated using a table.

Figure 7:
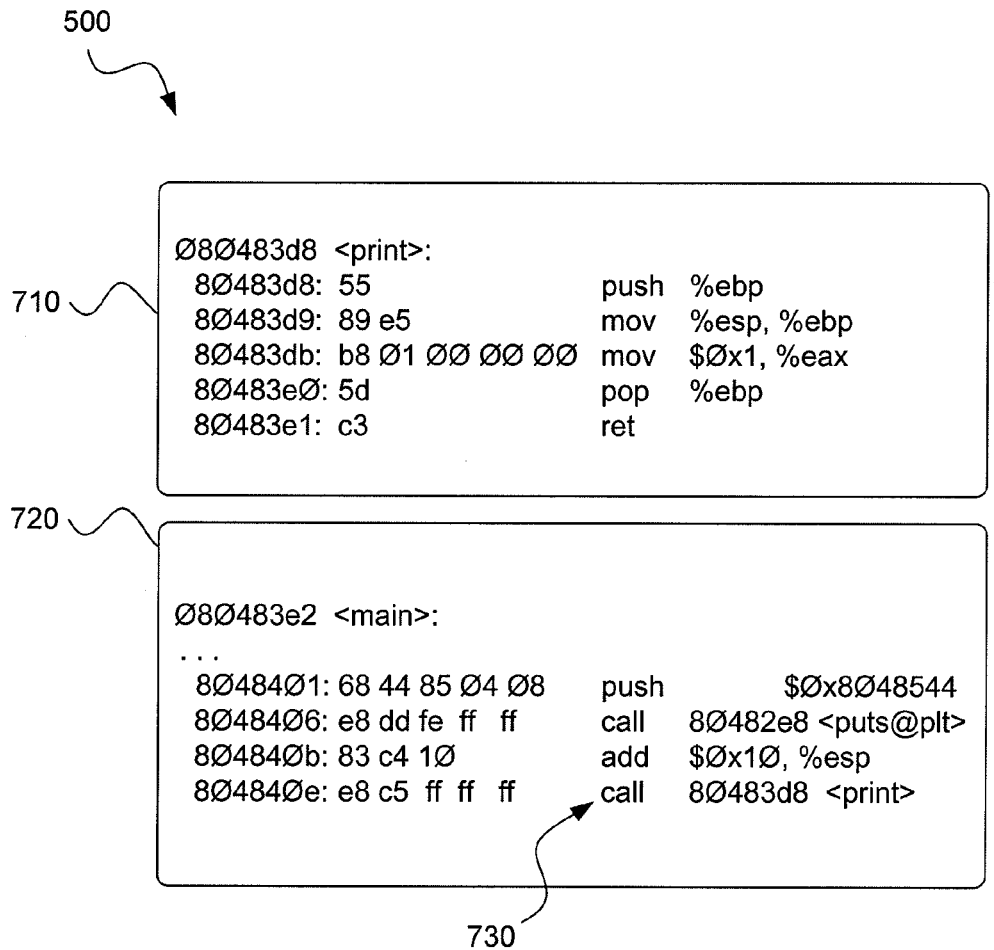
FIG. 7 includes an illustration of compiled code with annotations, according to various embodiments of the invention.

FIG. 7 includes an illustration of compiled code with annotations, according to various embodiments of the invention. Two code Segments 710 and 720 are shown. Code segment 710 may be included in Library 142B while code Segment 720 is included in Executable Application 162B. In each code segment, a hexadecimal representation of executable instructions is shown to the left and annotations of the instructions are shown to the right. For example, the instruction at hexadecimal address 804840e will be interpreted by a processor as the instruction "call." The instruction "call" is configured to use an operand that is a label to a function. This label may be an absolute reference to a memory location or may be a symbol. Specifically, in the example shown the instruction "call" will operate using the operand 80485d8, which is an address of a function "print." When an unresolved symbol is resolved, it can be replaced by an address or similar. Parser 520 is configured to differentiate between symbols that have been replaced by addresses (e.g., resolved symbols) and symbols that have yet to be replaced by addresses (e.g., unresolved symbols).

Figure 8:
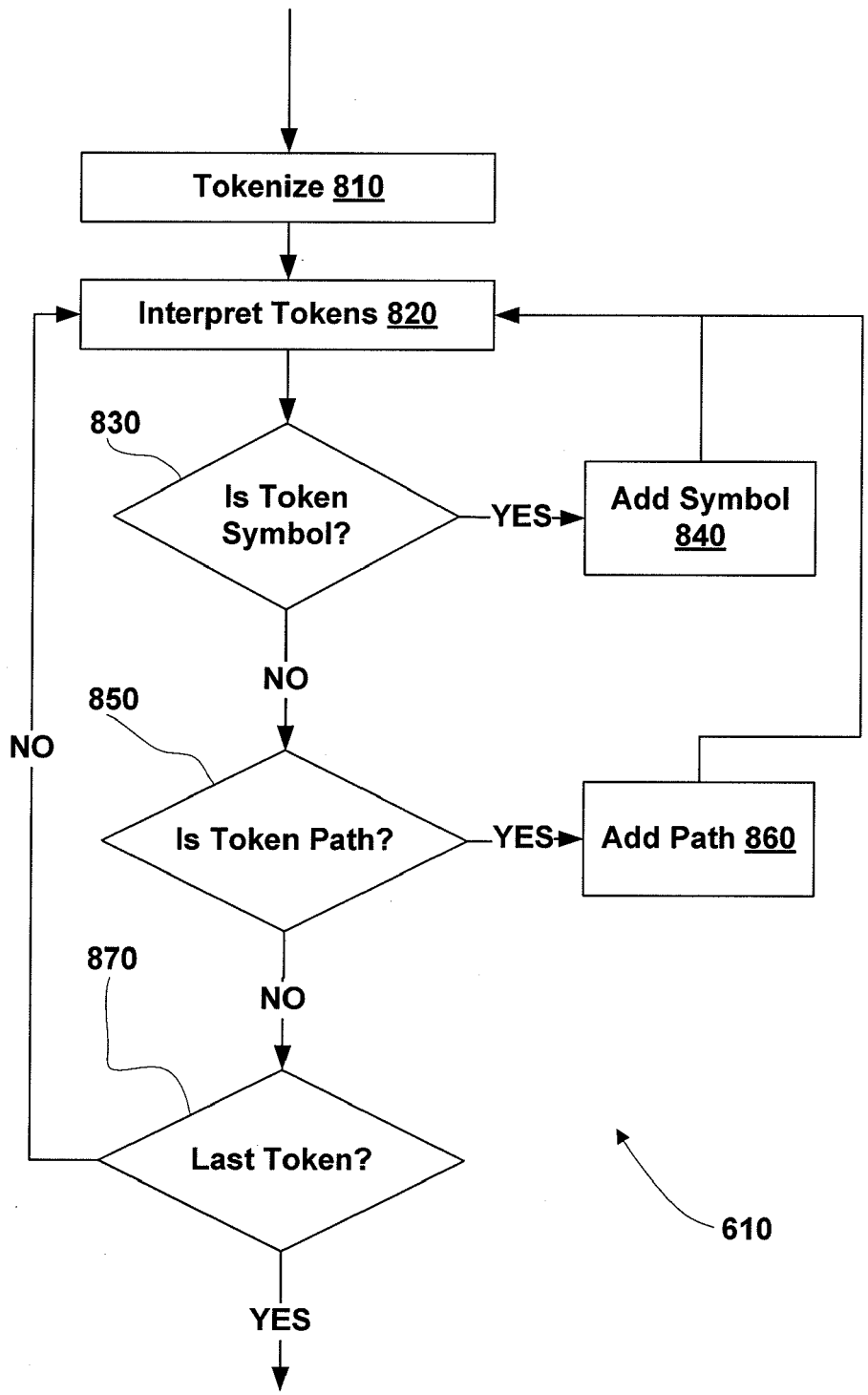
FIG. 8 is a flowchart illustrating sub-steps of a step of FIG. 6, according to various embodiments.

FIG. 8 is a flowchart illustrating sub-steps of the Identify Symbols Step 610 of FIG. 6, according to various embodiments. These sub-steps may be used, for example, when the executable application includes a binary file, script, text, and/or similar grammatical structure. For example, this method may be used to identify text that includes file names and/or directory paths. These elements, like undefined symbols, create dependencies between an executable application and other resources. As such, they are handled in various embodiments in manners similar to undefined symbols.

In a Step 810, the executable application is tokenized. Tokenization includes demarcating and optionally classifying sections of a string of input characters. For example, the beginning and ending of an operator or a symbol may be demarcated. The tokenization process allows the Parser 520 to identify individual symbols and, thus, interpret a binary file or script correctly.

In Interpret Tokens Step 820 Parser 520 is used to examine the executable application one token at a time. For each token within the executable application, an Is Token Symbol Step 830 is used to determine if the token is a symbol. If the token is a symbol, then it is added to a list of symbols. The method then returns to Interpret Tokens Step 820.

If the token is not a symbol, then an Is Token Path Step 850 is used to determine if the token is a path and/or file name. The file name may be the name of a file including a script, an application, a library, or a device driver. The path may include an absolute file system path, e.g., c:\lib\mylib1, a relative file system path, e.g., .\lib\mylib1, or a network address, e.g., www.fastscale.com\lib. If the file is a path then the path is added to a list of paths in an Add Path Step 860. The method then returns to Interpret Tokens Step 820.

Steps 820 thru 860 are repeated for each token until it is determined that the last token has been processed in a Last Token Step 870.

The methods illustrated by FIG. 6 typically do not require execution of Executable Application 162B. However, in some embodiments, an application environment specification is generated or modified while executing Executable Application 162B. In these embodiments, the generation of the application environment specification is dynamic. For example, a dependency may be found during execution rather than prior to execution. When found, this dependency is added to the application environment specification and the required resource is located and added to the application specific runtime environment in real-time.

Figure 9:
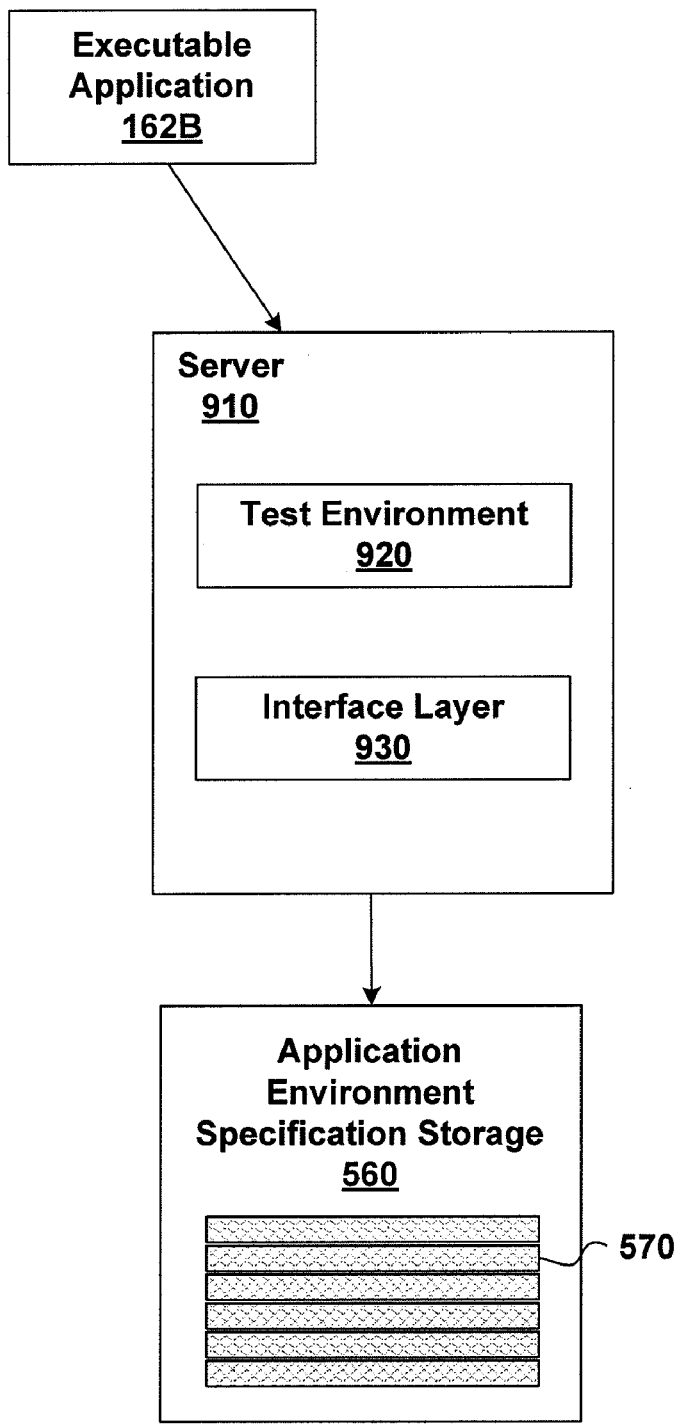
FIG. 9 is a block diagram illustrating details of an exemplary server configured for dynamically determining an application environment specification, according to various embodiments of the invention.

FIG. 9 is a block diagram illustrating details of an exemplary Server 910 configured for dynamically determining an application environment specification, according to various embodiments of the invention. The Server 910 may include a physical computing device or a virtual machine, and comprises a Test Environment 920 and an Interface Layer 930.

The Test Environment 920 is either a general runtime environment or an application specific runtime environment. For example, the Test Environment 920 may comprise a general runtime environment including Red Hat Enterprise 3.0 with a full set of standard libraries installed. Alternatively, the Test Environment 920 may include an application specific runtime environment provisioned using an application environment specification previously generated using the methods of FIG. 6, or the like.

When the Test Environment 920 is a general runtime environment, the application environment specification is generated by monitoring which resources within the general runtime environment are actually used in the execution of Executable Application 162B. When a resource is used, it is added to the application environment specification.

Resources within the general runtime environment that are not used are not added to the application environment specification. After running Executable Application 162B for some time or completely, the application environment specification is saved in Application Environment Specification Storage 560.

When the Test Environment 920 is an application specific runtime environment, the execution of the Executable Application 162B is monitored and if a required resource is found not to be in the application specific runtime environment, then the application environment specification used to provision the application specific runtime environment is modified to include the required resource. Optionally, the required resource is located and added to the application specific runtime environment in real-time.

In various embodiments, several approaches are used to generate and modify an application specific runtime environment. For example, in some embodiments, an Executable Application 162B is first executed in a general runtime environment in order to generate a first version of an application environment specification. Executable Application 162B is then executed in an application specific runtime environment in order to modify the first version of the application environment specification. In other embodiments, a first version of an application environment specification is generated using the methods illustrated in FIG. 6, and this first version is then modified by executing Executable Application 162B within an application specific runtime environment.

The Interface Layer 930 is configured to monitor communications between the Executable Application 162B and the Test Environment 920. If the communication involves a use of resources, then these resources are identified as being required for the execution of the Executable Application 162B. Interface Layer 930 is optionally configured to monitor communications by monitoring activity of a file system within the Test Environment 920. For example, Interface Layer 930 may be configured to intercept requests to open a file. In some embodiments, Interface Layer 930 is configured to operate between the Executable Application 162B and an operating system of Test Environment 920.

Figure 10:
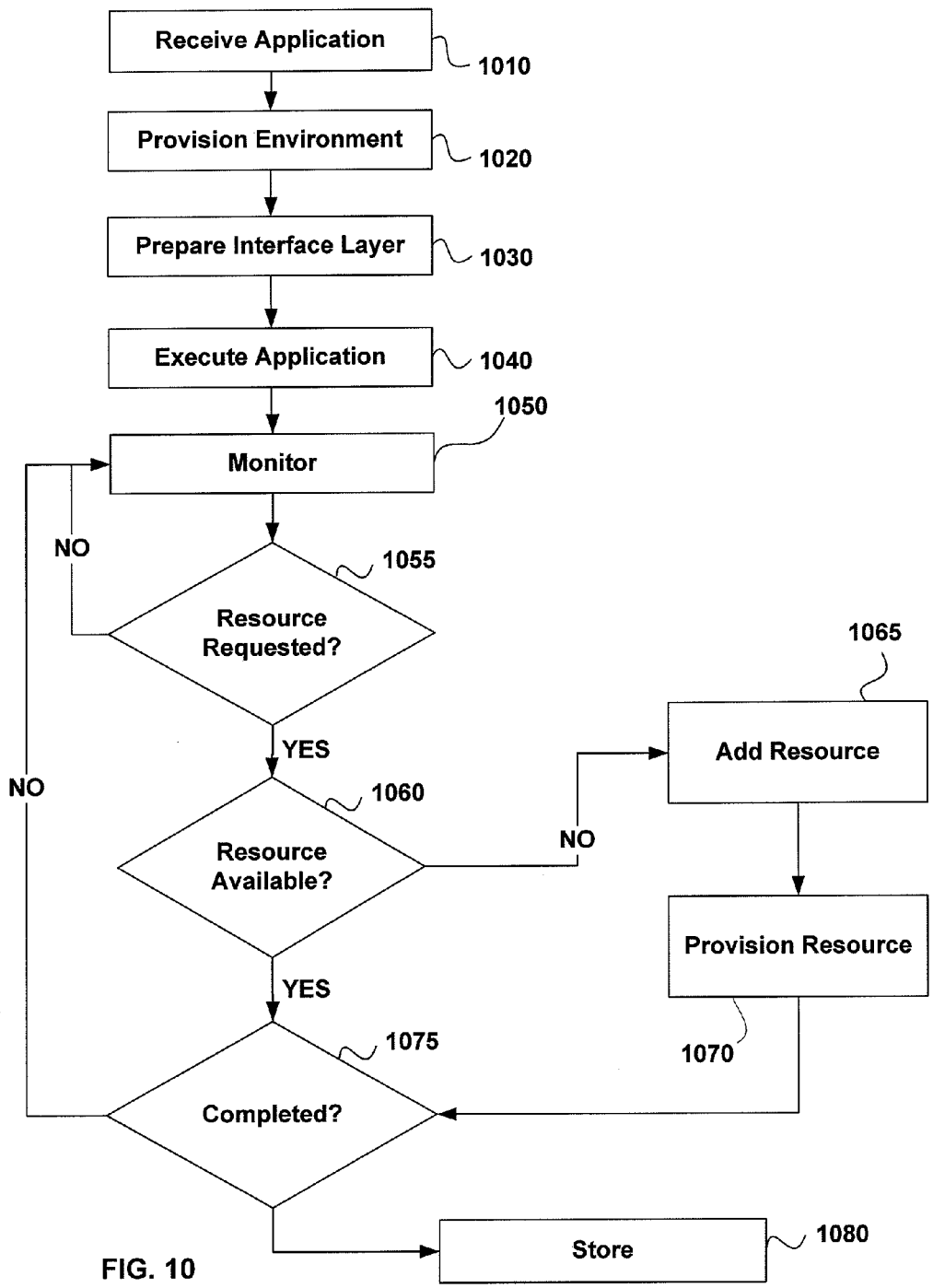
FIG. 10 is a flowchart of methods for dynamically modifying an application environment specification, according to various embodiments of the invention.

FIG. 10 is a flowchart of methods for dynamically modifying an application environment specification, according to various embodiments of the invention. In these methods, it is assumed that at least a version of an application environment specification already exists. This application environment specification is used to generate a Test Environment 920 in which Executable Application 162B is executed. Interface Layer 930 is used to monitor the execution and modify the application environment specification as needed.

Specifically, in a Receive Application Step 1010, the Executable Application 162B is received by Server 910. This receipt may be in response to an end user requesting use of Executable Application 162B or in response to an administrator requesting execution of Executable Application 162B for the purpose of generating/modifying an application environment specification. As is described elsewhere herein, the Executable Application 162B may be received from a storage location.

In a Provision Environment Step 1020, an application specific runtime environment, such as Application Specific Runtime Environment 200, is provided with the resources required to execute Executable Application 162B according to the application environment specification associated with the Executable Application 162B. As is further described elsewhere herein, these resources may be retrieved from Resource Repository 530. In some embodiments, Provision Environment Step 1020 includes establishing a virtual machine on which Executable Application 162B is to execute.

In a Prepare Interface Layer Step 1030, the Interface Layer 930 is added to the provisioned application specific runtime environment. This step may include, for example, adding software hooks to the Executable Application 162B such that Interface Layer 930 can monitor communications between Executable Application 162 and the operating system.

In Execute Application Step 1040, the Executable Application 162B is executed. This execution will optionally include communications between the Executable Application 162B and a user or administrator. For example, if the Executable Application is a database or accounting application, execution may involve communication of queries or data from the user or administrator to the Executable Application 162B. These communications may cause various components, which require various resources, within the Executable Application 162B to be executed.

In a Monitor Step 1050, the execution of Executable Application 162B is monitored using Interface Layer 930 in order to determine resources requested and/or used by Executable Application 162B.

In a Resource Requested Step 1055, it is determined whether a resource has been requested by Executable Application 162B. If a resource has not been requested, then the method continues with Monitor Step 1050.

If a resource has been requested, then in a Resource Available Step 1060, Interface Layer 930 is used to determine if the requested resource is included in the application environment specification associated with the Executable Application 162B. If the resource is included in the application environment specification, then it should have been made available as part of Provisional Environment Step 1020.

If the resource is not available, then in an Add Resource Step 1065 the resource is added to the application environment specification. The resource is typically then added to the application specific runtime environment in a Provision Resource Step 1070. Provision Resource Step 1070 may include, for example, copying the resource from Resource Repository 530 to the application specific runtime environment.

If, in Resource Available Step 1060 it is determined that the resource is available, then the method returns to a Completed Step 1075 in which it is determined whether or not the execution of the Executable Application 162B is completed. If the execution is not completed then the method returns to Monitor Step 1050. Steps 1050 through 1075 may be repeated until the execution of Executable Application 163B is completed.

If the execution is completed then the method proceeds to a Store Step 1080. In Store Step 1080, the modified application environment specification is stored, for example, in Application Environment Specification Storage 560.

Figure 11:
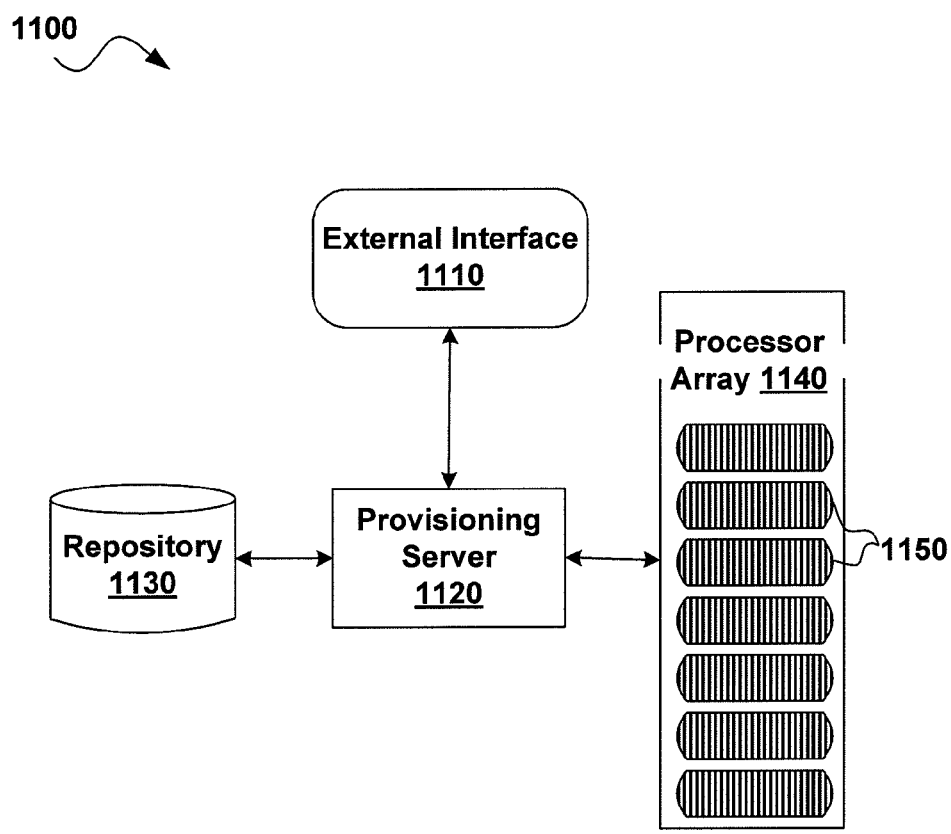
FIG. 11 illustrates an application provisioning system, according to various embodiments of the invention.

FIG. 11 illustrates an Application Provisioning System 1100, according to various embodiments of the invention. The Application Provisioning System 1100 is configured for supporting a plurality of Executable Applications 162 each in a possibly different application specific runtime environment. Application Provisioning System 1100 may be used, for example, to provide executable applications to an enterprise or other group of users. When Application Provisioning System 1100 is used to provide multiple executable applications, the advantages of using application specific runtime environments rather then general runtime environments are achieved for each executable application.

The Application Provisioning System 1100 comprises an External Interface 1110, a Provisioning Server, 1120, a Repository 1130, and a Processor Array 1140. The Provisioning Server 1120 is in communication with the External Interface 1110, the Repository 1130, and the Processor Array 1140.

External Interface 1110 is configured for an end user or an administrator to request execution of one or more of Executable Applications 162. For example, in some embodiments, External Interface 1110 includes a network interface configured to receive commands from remote user clients, and an administrative terminal configured for use by an administrator of Application Provisioning System 1100. Typically, Application Provisioning System 1100 is configured to support a variety of different Executable Applications 162 and to execute these Executable Applications 162 in parallel.

Repository 1130 is configured to store a plurality of application environment specifications and resources required by Executable Applications 162 according to these specifications. A single copy of a resource stored in Repository 1130 may be used by several different Executable Applications 162. Repository 1130 may include hard drives, optical drives, and/or other types of memory. Repository 1130 is optionally distributed among more than one device. Repository 1130 is optionally includes embodiments of Resource Repository 530 and Application Environment Specification Storage 560. In some embodiments, Repository 1130 is configured to further store executable applications, e.g., Executable Applications 162.

Provisioning Server 1120 is configured to execute Executable Applications 162 in response to commands received from External Interface 1110. For example, Provisioning Server 1120 is configured to receive a request for execution of Executable Application 162B, to provision an application specific runtime environment for Executable Application 162B according to an associated application environment specification, and to execute Executable Application 162B in the provisioned application specific runtime environment. The execution of Executable Application 162B typically occurs on Processor Array 1140. Provisioning Server 1120 optionally includes an embodiment of Computing System 510. Provisioning Server 1120 is optionally distributed among more than one device.

Processor Array 1140 includes one or more Processor Nodes 1150, each configured to support execution of at least one application specific runtime environment. Processor Array 1140 is optionally distributed among more than one device. In some embodiments, Processor Array 1140 includes a rack and a plurality of processing blades. In alternative embodiments, Provisioning Server 1120 is configured to provision an application specific runtime environment on a Processor Node 1150 that is not part of a processor array. This Processor Node 1150 may include, for example, a single application server. In these embodiments, Processor Array 1140 is optional.

In some embodiments, Provisioning Server 1120 is configured to provision a virtual machine within Processor Array 1140. In these embodiments, the virtual machine may be defined using information included in the application environment specification. For example, the application environment specification my include information regarding the memory needed to store required resources during execution and the memory required for the allocation of variables and the like during execution. Use of this information allows creation of a virtual machine that includes characteristics that are tuned for a specific executable application. The tuned virtual machine is more resource efficient than would be possible without this information. In some embodiments, the virtual machine is provisioned.

During execution of the Executable Application 162B, communication between External Interface 1110 and the Executable Application 162B may occur through Provisioning Server 1120 or directly between External Interface 1110 and Processor Array 1140.

Figure 12:
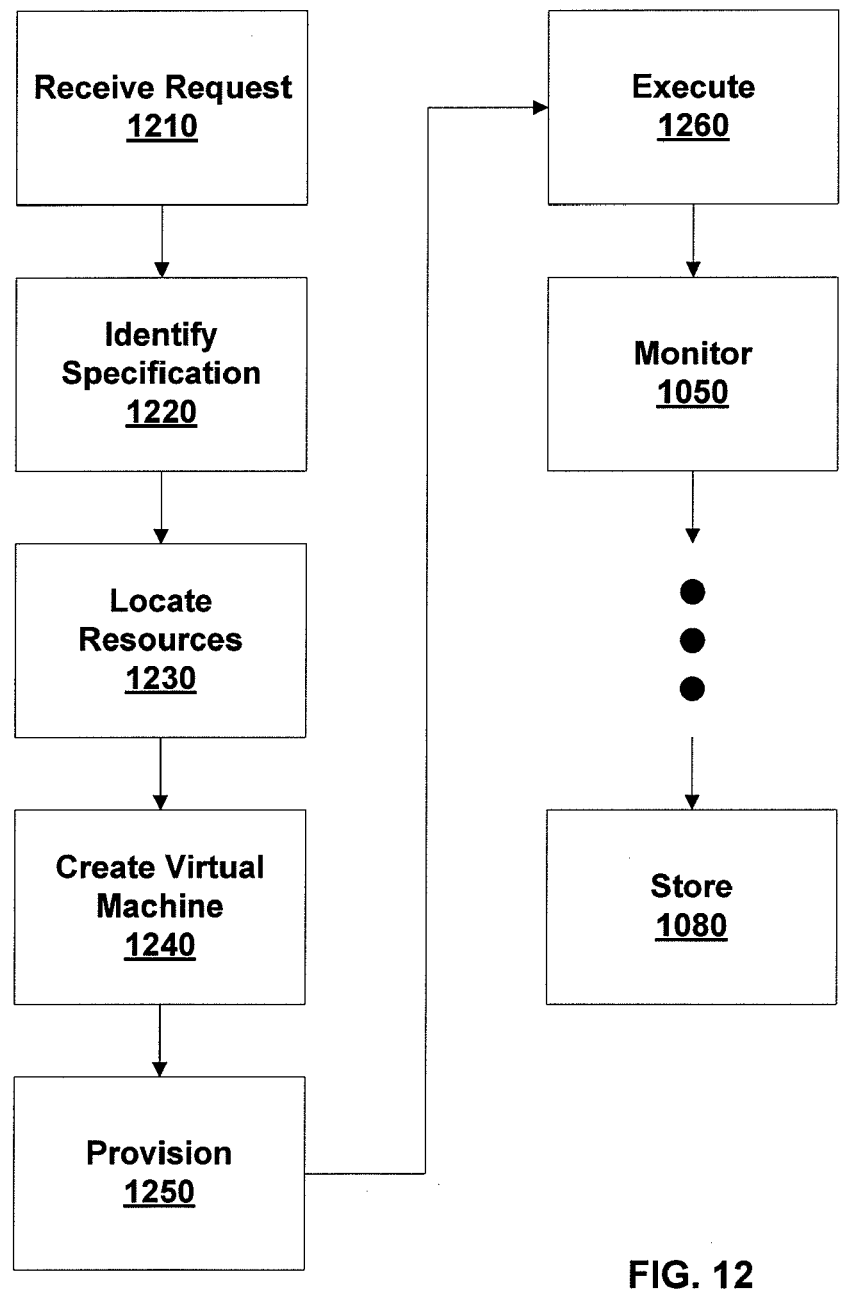
FIG. 12 illustrates method of executing an executable application using the application provisioning system illustrated in FIG. 11, according to various embodiments.

FIG. 12 illustrates method of executing Executable Application 162B using the Application Provisioning System 1100 illustrated in FIG. 11, according to various embodiments. In these methods, an application specific runtime environment is provisioned in response to a request to execute one or more of Executable Applications 162. The requested Executable Application 162 is executed within the application specific runtime environment. Optionally, the application specific runtime environment is modified in response to information learned by executing the requested Executable Application 162. The steps illustrated in FIG. 12 are optionally performed in real-time. For example, in some embodiments, an end user can request execution of one of Executable Applications 162 and be using the Executable Application 162 without an unreasonable delay.

Specifically, in a Receive Request Step 1210, a request is received from an end user or an administrator for the execution of Executable Application 162B. This request is received by Provisioning Server 1120 via External Interface 1110. The user may make the request by clicking an icon associated with Executable Application 162B or by entering a name of Executable Application 162B on a command line.

In an Identify Specification Step 1220, Provisioning Server 1120 is used to identify an application environment specification associated with Executable Application 162B. The application environment specification may be stored in Repository 1130 or elsewhere accessible to Provisioning Server 1120. If an application environment specification is not found, Computing System 510 is optionally used to generate the application environment in real-time.

In a Locate Resources Step 1230, Provisioning Server 1120 uses the information within the application environment specification to identify and locate the resources required by Executable Application 162B. Typically, Provisioning Server 1120 is first configured to look for these resources in Repository 1130.

In an optional Create Virtual Machine Step 1240, a virtual machine is created within one of Nodes 1150. Characteristics of the virtual machine are optionally selected based on information within the application environment specification. For example, resources included within the virtual machine may be selected to optimally meet the requirements of Executable Application 162B. Create Virtual Machine Step 1240 is optional when the application specific runtime environment is provisioned on a physical rather than a virtual machine.

In a Provision Step 1250, the application specific runtime environment is provisioned within one of Nodes 1150. Typically, provisioning includes copying Executable Application 162B and the resources specified in the application environment specification from Repository 1130 to the provisioned node.

In an Execute Step 1260, Executable Application 162B is executed within the provisioned application specific runtime environment. This execution typically includes communication of commands and data between Executable Application 162B and the end user via External Interface 1110. These commands and data may pass through Provisioning Server 1120 or may pass from Node 1150 to External Interface without passing through Provisioning Server 1120.

Steps 1240 through 1260 are typically performed using Provisioning Server 1120.

As illustrated in FIG. 12, Monitor Step 1050 through Store Step 1080 as illustrated in FIG. 10 are optionally performed during the execution of Executable Application 162B. These steps include Steps 1055, 1060, 1065, 1070 and 1075. Monitor Step 150 through Store Step 1080 are optionally performed by Provisioning Server 1120 or by an embodiment of Interface Layer 930 included within Processor Array 1140.

A log of events relating to the execution of Executable Application 162B is optionally generated by Provisioning Server 1120 and/or Node 1150. This log may be stored in Repository 1130.

Several embodiments are specifically illustrated and/or described herein. However, it will be appreciated that modifications and variations are covered by the above teachings and within the scope of the appended claims without departing from the spirit and intended scope thereof. For example, the methods disclosed herein may be accomplished using computing instructions stored on computer readable media.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A system comprising:
   a resource repository configured to store resources configured to be used by an executable application;
   a parser comprising instructions stored on a non-transitory computer-readable storage medium for controlling a computer system to be operable to:
      identify a first undefined symbol in the executable application, the undefined symbol not including a definition within the application,
      identify a first member of the resources stored in the resource repository including a definition of the first undefined symbol, and
      add an identity of the first member to an application environment specification, wherein the application environment specification identifies a set of resources required by the application for execution, the set of resources including the first member;
   an application environment specification storage configured to store the application environment specification, and
   a provisioning server configured to use the application environment specification to provision an application specific application runtime environment for the executable application,
   wherein the identity of the first member of the resources is configured to be used to include the first member in the set of resources provisioned for the application specific runtime environment in which the executable application is executed.

2. The system of claim 1, wherein the parser is further operable to identify a second undefined symbol in the first member of the resources, to identify a second member of the resources including a definition of the second undefined symbol, and to add an identity of the second member to the application environment specification.

3. The system of claim 1, wherein the parser is further operable to add an identifier of a component of the first member of the resources to the application environment specification.

4. The system of claim 1, wherein the parser is further operable to use the first member of the resources to resolve an undefined symbol in a second member of the resources.

5. The system of claim 1, wherein the parser is operable to tokenize the executable application.

6. The system of claim 1, wherein the resources include a library.

7. The system of claim 1, wherein the resources include a device driver.

8. The system of claim 1, wherein the executable application includes binary code.

9. The system of claim 1, wherein the executable application includes a script.

10. The system of claim 1, wherein the application environment specification includes information identifying a target hardware configuration.

11. The system of claim 1, wherein the parser is operable to identify the first undefined symbol without executing the executable application.

12. A system comprising:
   a resource repository configured to store resources configured to be used by an executable application;
   a parser comprising instructions stored on a non-transitory computer-readable storage medium for controlling a computer system to be operable to:
      identify a first undefined symbol in the executable application, the undefined symbol not including a definition within the application, wherein the parser is operable to identify the first undefined symbol by executing the executable application and monitoring resources requested by the executable application,
      identify a first member of the resources stored in the resource repository including a definition of the first undefined symbol; and
      add an identity of the first member to an application environment specification, wherein the application environment specification identifies a set of resources required by the application for execution, the set of resources including the first member; and
   an application environment specification storage configured to store the application environment specification,
   wherein the identity of the first member of the resources is configured to be used to include the first member in the set of resources provisioned for an application specific runtime environment in which the executable application is executed.

13. The system of claim 1, wherein the application environment specification storage is configured to store a plurality of application environment specifications.

14. The system of claim 1, wherein the application environment specification storage is configured to store a multi-application environment specification.

15. The system of claim 1, wherein the application environment specification storage is configured to store a plurality of multi-application environment specifications.

16. The system of claim 1, wherein the application environment specification includes an image of at least part of the application specific runtime environment, the image including the set of the resources.

17. The system of claim 1, wherein the first member of the resources comprises a software library used by the executable application and another executable application.

18. The system of claim 1, wherein the set of resources provisioned for the application specific runtime environment includes less resources provisioned for a general runtime environment.

19. A method comprising:
identifying a first unresolved symbol in an executable application, the unresolved symbol not including a definition within the executable application;
identifying, by a computing device, a first resource comprising a definition of the first unresolved symbol, the first resource being stored in a resource repository;
adding, by the computing device, a first identifier of the first resource to an application environment specification, the application environment specification comprising a specification of a set of resources required by the application for execution, the set of resources including the first resource;
determining if the first resource includes a second unresolved symbol;
if the first resource includes a second unresolved symbol, identifying a second resource comprising a definition of the second unresolved symbol and adding a second identifier of the second resource to the application environment specification;
associating the executable application with the application environment specification, receiving a request for execution of the executable application;
retrieving the application environment specification in response to receiving the request; and
provisioning an application specific runtime environment using the retrieved application environment specification,
wherein the first identifier of the first resource and the second identifier of the second resource are configured to be used to include the first resource and the second resource in the set of resources provisioned for the application specific runtime environment in which the executable application is executed.

20. The method of claim 19, further including tokenizing the executable application.

21. The method of claim 19, further including adding a directory path of a resource on which the executable application depends, to the application environment specification.

22. The method of claim 19, wherein the step of identifying the first unresolved symbol is performed without executing the executable application.

23. The method of claim 19, wherein the step of identifying the first unresolved symbol is performed by monitoring resources required by the executable application during execution.

24. The method of claim 19, further comprising
executing the executable application,
monitoring resources required by the executable application during execution, and
updating the application environment specification responsive to the monitored resources.

25. The method of claim 19, further comprising
executing the executable application in the application specific runtime environment.

26. The method of claim 19, further including creating a virtual machine based on information stored within the stored application environment, the application specific runtime environment being provisioned in the virtual machine.

27. A method comprising:
identifying an undefined symbol in an executable application, the undefined symbol not including a definition within the executable application;
identifying, by a computing device, a member of stored resources including a definition of the first undefined symbol, the stored resources being configured to be used by the executable application; and
adding, by the computing device, an identity of the member to an application environment specification, wherein the application environment specification identifies a set of resources required by the executable application for execution, the set of resources including the member;
wherein the identity of the member of the resources is configured to be used to include the member in the set of resources provisioned for the application specific runtime environment in which the executable application is executed.

28. The method of claim 27, wherein provisioning comprises provisioning the application specific runtime environment on a processing node for the executable application.

29. The method of claim 27, wherein the set of resources provisioned for the application specific runtime environment includes less resources included in a general runtime environment.

30. An apparatus comprising:
one or more computer processors; and
a computer-readable storage medium comprising instructions for controlling the one or more computer processors to be operable to:
identify an undefined symbol in an executable application, the undefined symbol not including a definition within the executable application,
identify a member of stored resources including a definition of the first undefined symbol, the stored resources being configured to be used by the executable application; and
add an identity of the member to an application environment specification, wherein the application environment specification identifies a set of resources required by the application for execution, the set of resources including the member;
wherein the identity of the member of the resources is configured to be used to include the member in the set of resources provisioned for the application specific runtime environment in which the executable application is executed.

* * * * *